United States Patent Office 2,787,727
Patented Apr. 2, 1957

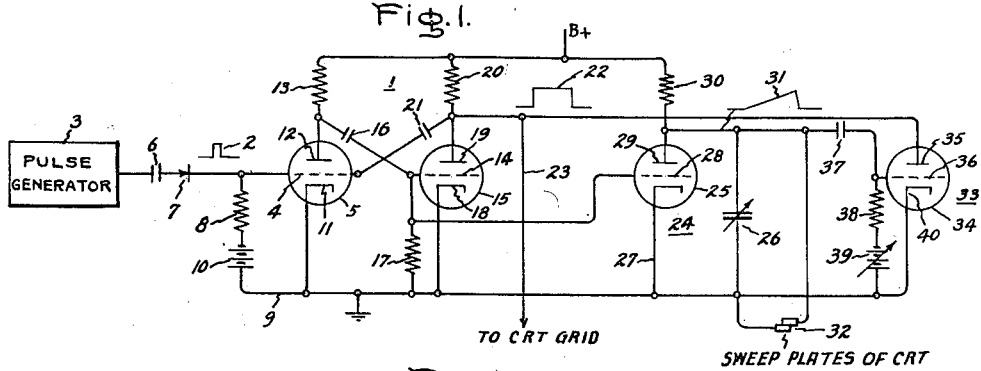

2,787,727

ELECTRICAL SYSTEM

Douglas R. Maure, Schenectady, and Paul C. Gardiner, Scotia, N. Y., assignors to General Electric Company, a corporation of New York Application November 6, 1951, Serial No. 255,012

5 Claims. (Cl. 315—22)

This invention relates broadly to electrical systems and, more particularly, to sweep or scanning circuits of the type employed in the display of pictures, wave shapes, etc. upon the sensitized face of a cathode ray tube.

In general, sweep or scanning circuits are utilized to deflect periodically the electron beam across the face of a cathode ray tube. This deflection is accomplished by applying to the sweep plates or coils of the cathode ray tube a synchronized linearly increasing voltage which moves the electron beam across the face of the cathode ray tube at a substantially uniform velocity. When the electron beam has traversed the face of the cathode ray tube, the deflection voltage is removed as suddenly as possible to permit the return of the electron beam to its original position in preparation for a succeeding application of the linearly increasing sweep voltage.

With sweep or scanning circuits known heretofore, it is not possible without elaborate precautions to remove the sweep voltage at precisely the desired instant when the electron beam has been deflected to the edge of the cathode ray tube. If the electron beam strikes the edge or side of the cathode ray tube, undesirable halo effects occur and disturb the pattern being displayed on the face of the tube.

Accordingly, a principal object of the present invention is to provide an improved sweep or scanning circuit having an output which may be accurately terminated at a predetermined instant.

Another object of the invention is to provide novel means for terminating the linearly increasing output of a saw-tooth voltage generator at a desired instant.

A further object of the invention is to provide a non-oscillatory sweep circuit which generates scanning waves in response to synchronizing signals, such waves being accurately terminable even at extremely fast sweep velocities.

Yet another object of the invention is to provide an economical, simple and efficient sweep circuit which is capable of adaptation to a variety of cathode ray tube applications.

Still another object of the invention is to provide a sweep circuit in which the sweep time may be varied over a very wide range without the sacrifice of an accurate termination of the sweep voltage at a desired instant.

A further object of the invention is to provide sweep circuits for cathode ray tubes in which a signal is supplied to the cathode ray tube at a desired predetermined time to extinguish the electron beam.

Another and further object of the invention is to provide sweep circuits employing multivibrators in which a signal is supplied to a cathode ray tube to extinguish the electron beam at a desired predetermined time independent of the multivibrator switching time.

According to the invention there is provided a pulse forming circuit, such as a multivibrator having first and second states of operation, which is interconnected by circuit means with the input of a saw-tooth voltage generator. Feedback circuit means responsive to the output of the saw-tooth voltage generator and connected to the output of the pulse forming circuit supplies a degenerative signal at a predetermined instant to the pulse forming circuit for returning it to its first state of operation after it has been transferred to its second state of operation to initiate the saw-tooth voltage output of the generator.

Other obejcts and advantages of this invention will be apparent from the following description taken in connection with the accompanying drawings in which Fig. 1 is a diagrammatic illustration of one embodiment of the novel electrical system; Fig. 2 illustrates the wave shapes which obtain at certain portions of the system of Fig. 1; and Fig. 3 is a diagrammatic illustration of another embodiment of the invention.

Referring particularly now to Fig. 1, there is shown according to the invention an electrical system comprising a pulse forming or multivibrator circuit 1, a saw-tooth voltage generator 24, and a feedback circuit 33. Synchronizing signals represented by wave form 2 may be fed from a pulse generator 3 into multivibrator circuit 1. Pulse generator 3 is connected to the control grid 4 of electron discharge device 5 through a decoupling capacitor 6 and a blocking rectifier 7, the latter of which serves to assure that only snychronizing signals of positive polarity reach the grid 4. The control grid circuit of discharge device 5 may include a grid leak resistor 8 which is connected to ground potential bus 9 through a source of biasing voltage 10. The cathode 11 of discharge device 5 is maintained at ground potential by connection to bus 9 as indicated. Plate 12 of discharge device 5 may be connected to a source of positive potential, denoted as B+, through a plate load resistor 13 and, in addition, coupled to the control grid 14 of a discharge device 15 through a capacitor 16. The control grid circuit of discharge device 15 includes a conventional grid leak resistor 17, and the cathode 18 is maintained at ground potential in a manner similar to the cathode 11 of discharge device 5. Plate 19 of discharge device 15 is also coupled to the B+ source of potential through a plate load resistor 20 and, in addition, is connected to the control grid of discharge device 5 through a capacitor 21.

The output of pulse forming or multivibrator circuit 1 is represented by wave form 22 and may be applied by a connection 23 from plate 19 of discharge device 15 to the intensity-controlling grid of a cathode-ray tube (not shown). It is well known to those skilled in the art that the potential upon the grid of a cathode-ray tube controls the intensity of the light which emanates from the sensitized face of the tube as a result of the impingement thereupon of the electron beam. This grid is normally biased negative to prevent the impingement of electrons upon the face of the cathode-ray tube, and it is gated by the pulse output of the multivibrator circuit to permit electrons to strike the face of the cathode-ray tube for the duration of the gating pulse.

In further conformance with the invention there is provided a saw-tooth voltage generator 24 which comprises an electron discharge device 25 and a variable sweep capacitor 26 connected in circuit therewith as shown. Discharge device 25 includes a cathode 27 maintained at ground potential, a control grid 28 which is connected to control grid 14 of discharge device 15, and a plate 29 which is connected through a plate load resistor 30 to the source of B+ potential. The output of saw-tooth voltage generator 24, which is represented by waveform 31, is taken across sweep capacitor 26, and it may be directed to the schematically illustrated sweep plates 32 of the hereinbefore mentioned cathode-ray tube which, for the sake of simplicity, has not been fully shown in the drawing. To control accurately the termination of the output of saw-tooth voltage generator 24 and the termination of the output of pulse forming circuit 1, there is provided a feedback circuit 33 comprising an electron discharge device 34 having a plate 35 which is coupled to plate 19 of discharge device 15. Feedback circuit 33 is made responsive to the output of saw-tooth voltage generator 24 by connecting the control grid 36 of discharge device 34 to plate 29 of discharge device 25 through a decoupling capacitor 37. The control grid circuit of discharge device 34 also includes a grid leak resistor 38 and a source of variable biasing potential 39. The cathode 40 of discharge device 34 is maintained at ground potential by connection to bus 9 in the manner illustrated.

To understand the operation of the system of the invention, assume that, in the first state of operation of multivibrator circuit 1, discharge device 5 is not conducting as a result of the bias potential supplied to grid 4 by source 10, while discharge device 15 is conducting because of the absence of bias potential on grid 14. When a positive synchronizing pulse 2 is applied to grid 4, discharge device 5 is suddenly rendered conductive with the consequent amplified lowering of the potential of plate 12. Since the voltage across a capacitor tends to remain constant, the potential of grid 14 of discharge device 15 will be driven abruptly negative due to the impulse transmitted through capacitor 16 from plate 12 of discharge device 5. This causes the plate potential of discharge device 15 to rise sharply, as is indicated by wave form 2, and hence gates the electron beam of the cathode-ray tube in the manner hereinbefore described. In the absence of the application of further external signals to multivibrator circuit 1, it continues in this second state of operation, with discharge device 5 conducting and discharge device 15 being non-conductive, until the charge on capacitor 16 decays exponentially through the discharge path including discharge device 5 and grid leak resistor 17 and the potential of grid 14 reaches the cut-off of potential of discharge device 15. Thereupon, discharge device 15 again becomes conductive with the consequent sudden lowering of the potential of plate 19 as represented by wave form 22. The resulting negative impulse is transmitted through capacitor 21 to grid 4 whereby discharge device 5 is rendered non-conductive and multivibrator circuit 1 returned to its first state of operation. The variation in potential of grid 4 during this normal cycle of operation of multivibrator circuit 1 is represented by curve A of Fig. 2 while the variation in potential of grid 14 is represented by curve B of Fig. 2.

During the period when multivibrator circuit 1 resides in its first state of operation with discharge device 15 conducting, discharge device 25 is also conducting since the potential of grid 28 is the same as the potential of grid 14. Therefore, during this period the voltage across sweep capacitor 26 is relatively small as determined by the potential drop across discharge device 25. However, when multivibrator circuit 1 is transferred to its second state of operation with discharge device 15 not conducting, discharge device 25 ceases to conduct and sweep capacitor 26 is charged from the B+ voltage supply through resistor 30 to produce an output indicated by wave form 31.

From the foregoing description it will be understood by those skilled in the art that the sweep output from saw-tooth generator 24 continues for the time that discharge device 25 remains non-conductive due to the application of negative potential to grid 28 by the discharge of capacitor 16. When multivibrator circuit 1 is returned to its first state of operation or "triggered," the sweep output of saw-tooth generator 24 is terminated because the potential of grid 28 rises above the cut-off potential of discharge device 25. In some situations, by careful selection of circuit constants and with the utilization of special measures for each individual device, the sweep output of saw-tooth generator 24 may be terminated at a desired instant. This, however, is an expensive and time-consuming procedure. Moreover, it is virtually impossible to arrange for proper termination of the sweep output of saw-tooth generator 24 for a wide range of sweep times which are required in some applications. Furthermore, the termination of the gating pulse to the cathode-ray tube grid is dependent upon the switching time of multivibrator circuit 1, and this introduces the possibility that the electron beam will not be extinguished at the proper instant to prevent the undesirable halo effects mentioned hereinbefore.

According to the present invention feedback circuit 33 provides means for accurately terminating the sweep output of saw-tooth generator 24 at a desired instant and also simultaneously provides means for terminating the gating signal to the grid of the cathode-ray tube at a desired instant independent of the switching time of multivibrator circuit 1. Since grid 36 of discharge device 34 is connected to the output of saw-tooth voltage generator 24 as above described, the conduction or non-conduction of discharge device 34 is determined by the magnitude of the sweep output of saw-tooth voltage generator 24 in conjunction with the bias supplied by source 39. The amount of bias supplied by source 39 is adjusted so that the net bias on grid 36 causes discharge device 34 to conduct at the instant at which it is desired to terminate the output of saw-tooth voltage generator 24 and the gating pulse to the grid of the cathode-ray tube. When discharge device 34 conducts, the potential of plate 35 lowers abruptly thereby reducing the potential upon the cathode-ray tube grid and turning off the electron beam. Simultaneously, the potential of plate 19 of discharge device 15 is abruptly lowered and the resulting degenerative impulse is transmitted through capacitor 21 to grid 4 of discharge device 5; whereupon discharge device 5 is rendered non-conductive and multivibrator circuit 1 is returned to its first state of operation.

It will be observed from curves C and D of Fig. 2 that the wave shape of the potential upon grids 4 and 14, respectively, remains generally the same as it is in the absence of feedback circuit 33 (c. f. curves A and B) except that the duration of the second state of operation of multivibrator circuit 1 may be shortened as desired. In terminating the second state of operation of multivibrator circuit 1 as above described, considerable advantage is achieved from the expedient of applying the degenerative signal or impulse from discharge device 34 to plate 19 of discharge device 15 as well as to grid 4 of discharge device 5; because, as the sweep velocity is increased, the magnitude of degenerative signal required to "trigger" multivibrator circuit 1 increases exponentially. Therefore, the additive effect obtained by applying the degenerative signal to plate 19 of discharge device 15 facilitates multivibrator "tripping" at the faster sweep velocities and reduces the amount of amplification required in feedback circuit 33. Curve E of Fig. 2 represents the plate current of discharge device 34, and it is to be noted that discharge device 34 conducts only for a very short period. The reason for this is apparent when it is noted that, once multivibrator circuit 1 is returned to its first state of operation by the feedback impulse, discharge device 25 is rendered conductive and hence discharge device 34 becomes non-conductive.

In Fig. 3 there is illustrated another embodiment of the invention in which a different form of multivibrator circuit is employed in conjunction with direct current coupling between the several stages. As illustrated, this system comprises a pulse forming or multivibrator circuit 41, a saw-tooth generator 42 and a feedback circuit 43. Synchronizing pulses are supplied to the control grid 44 of a discharge device 45 from a pulse generator 46, the output of which is connected in series with a decoupling capacitor 47 and a blocking rectifier 48. The control grid circuit of discharge device 45 includes a grid leak resistor 49 connected to ground as shown. The control grid 51 of a discharge device 52 is connected to ground through a grid leak resistor 53 and to the plate 54 of discharge device 45 through a parallel combination including the resistor 55 and capacitor 56. The cathode circuits of discharge devices 45 and 52 comprise a common cathode resistor 57. Plate 58 of discharge device 52 is coupled to the control grid 44 of discharge device 45 through the parallel combination of a resistor 59 and a capacitor 60. Plate potential is supplied to discharge devices 45 and 52, respectively, through plate load resistors 61 and 62 as indicated.

Saw-tooth generator 42 is similar to saw-tooth generator 24 described hereinbefore and comprises a discharge device 63 having a control grid 64 and a plate 65. Potential responsive to the change in the operational state of multivibrator circuit 41 is applied to grid 64 through a voltage divider which includes resistors 66 and 67, the former of which is connected to grid 51 of discharge device 52. Negative biasing potential is provided for grid 64 by means of a battery 68 in order to lower the direct current potential of grid 64 to maintain discharge device 63 normally conductive. B+ potential is conducted to discharge device 63 and a sweep capacitor 69 through a plate load resistor 70.

Feedback circuit 43, which performs a function similar to feedback circuit 33 discussed hereinbefore in connection with Fig. 1, comprises an electron discharge device 71 having a plate 72, a control grid 73 and a cathode 74. Grid 73 is directly connected to sweep capacitor 69 by means of a connection 75. To maintain discharge device 71 normally non-conductive, bias battery 76 is inserted into the cathode circuit as shown.

The operation of the embodiment of Fig. 3 is similar to the operation of the Fig. 1 circuit and hence will not be described in detail. The hereinbefore described multivibrator circuit 1 is of the monostable type, i. e. it remains stable only when discharge device 15 is conducting and discharge device 5 is non-conducting and, when the order is reversed, it will return to its original state after capacitor 16 has sufficiently discharged. In contrast thereto, multivibrator circuit 41 is of the bistable type, and it will not return of its own accord to its first state of operation when it is triggered into its second state of operation; however, feedback circuit 43 supplies a degenerative signal for returning multivibrator circuit 41 to its first state of operation at the desired time. Capacitors 56 and 60 do not serve the same functions as capacitors 16 and 21, but instead are inserted to improve the high frequency response of multivibrator circuit 41.

Although the present invention has been described and illustrated in conjunction with two particular types of multivibrator circuits, other types may be employed with efficacy. For example, an article appearing in "Electronics" for October, 1946, pages 136, 138 discloses several multivibrator circuits which may be adapted for use in the system of the present invention by those skilled in the art. Furthermore the present invention is not restricted to the utilization of the particular saw-tooth generator described. An article entitled "Linear sweep circuits" and appearing in "Electronics" for December, 1946, pages 136, 138 illustrates several types of saw-tooth generators which may be used in place of the simplified generator disclosed herein. It will also be understood by those skilled in the art that amplifier or phase inversion circuits may be inserted as desired between the various stages of the system of the invention. Moreover, multi-grid electron discharge devices may be employed instead of the single grid devices specifically shown and described.

While particular embodiments of the invention have been shown and described, it will be obvious to those skilled in the art that various changes and modifications may be made without departing from the invention in its broader aspects and it is, therefore, intended in the appended claims to cover all such changes and modifications as fall within the true spirit and scope of this invention.

What we claim as new and desire to secure by Letters Patent of the United States is:

1. In an electrical system, a pulse forming circuit having first and second states of operation, a saw-tooth voltage generator, circuit means interconnecting said pulse forming circuit and the input of said generator for initiating the saw-tooth voltage output of said generator upon a change of said pulse forming circuit from said first state of operation to said second state of operation, means connected to the output of said pulse forming circuit for supplying a gating pulse to utilization means, and degenerative feedback circuit means responsive to the output of said pulse forming circuit for delivering a degenerative signal to said pulse forming circuit and returning said pulse forming circuit to said first state of operation.

2. In an electrical system, a multivibrator circuit having first and second states of operation for delivering a pulse signal of predetermined polarity, a saw-tooth voltage generator, circuit means interconnecting said multivibrator circuit and the input of said generator for initiating the saw-tooth voltage output of said generator in response to a change of said multivibrator circuit from said first state of operation to said second state of operation, feedback circuit means responsive to a predetermined voltage output of said saw-tooth voltage generator and connected to the output of said multivibrator circuit in degenerative relationship to said predetermined polarity of said pulse signal for returning said multivibrator circuit to said first state of operation, and means additionally connected to the output of said multivibrator circuit for supplying to utilization means a pulse dependent in duration upon the initiation of said feedback circuit means.

3. In an electrical system, a multivibrator circuit having first and second states of operation for delivering a pulse output of predetermined polarity, a source of synchronizing signals connected to the input of said multivibrator circuit for changing the operation of said multivibrator circuit from said first state to said second state and hence initiating the pulse output, a saw-tooth voltage generator, circuit means interconnecting said multivibrator circuit and the input of said generator for causing said generator to deliver a saw-tooth voltage output for the duration of the pulse output of said multivibrator circuit, sweep utilization means connected to the output of said saw-tooth voltage generator, feedback circuit means responsive to a predetermined voltage output of said saw-tooth voltage generator and connected to the output of said multivibrator circuit in degenerative relationship to said predetermined polarity of said pulse output of said multivibrator circuit for returning said multivibrator circuit to said first state of operation and terminating the output of said saw-tooth voltage generator, and means additionally connected to the output of said multivibrator circuit for supplying to said utilization means a pulse dependent in duration upon the initiation of said feedback circuit means.

4. In an electrical system, a multivibrator circuit having first and second states of operation for delivering a pulse output of predetermined polarity, a source of synchronizing signals connected to the input of said multivibrator circuit for changing the operation of said multivibrator circuit from said first state to said second state and hence initiating the pulse output, a saw-tooth voltage generator, circuit means interconnecting said multivibrator circuit and the input of said generator for causing said generator to deliver a saw-tooth voltage output for the duration of the pulse output of said multivibrator circuit, electron beam deflecting means connected to the output of said saw-tooth voltage generator, feedback circuit means responsive to a predetermined voltage output of said saw-tooth voltage generator and connected to the output of said multivibrator circuit in degenerative relationship to said predetermined polarity of said pulse output of said multivibrator circuit for returning said multivibrator circuit to said first state of operation and terminating the output of said saw-tooth voltage generator, and means additionally connected to the output of said multivibrator circuit for supplying to electron beam velocity determining means a pulse dependent in duration upon the initiation of said feedback circuit means.

5. In an electrical system, a monostable multivibrator circuit comprising a first normally non-conductive electron discharge device having a plate, control grid and cathode and a second normally conductive electron discharge device having a plate, control grid and cathode; a saw-tooth voltage generator comprising a third electron discharge device having a plate, control grid and cathode, said last-named control grid being connected to the control grid of said second normally conductive electron discharge device whereby the saw-tooth output voltage of said generator is initiated upon the change of said multivibrator circuit from its stable to its unstable condition; feedback means comprising a fourth electron discharge device having a plate, control grid and cathode, said last-named plate being connected to the plate of said second normally conductive discharge device and said last-named control grid being connected to the plate of said third electron discharge device whereby said fourth electron discharge device is rendered conductive at a predetermined output voltage of said generator to supply a degenerative impulse to the plate of said second normally conductive discharge device for returning said multivibrator circuit to its stable condition, and means additionally connected to the plate of said second normally conductive discharge device for supplying to electron beam velocity determining means a pulse dependent in duration upon conduction of said fourth electron discharge device.

References Cited in the file of this patent

UNITED STATES PATENTS

| | | |
|---|---|---|
| 2,265,290 | Knick | Dec. 9, 1941 |
| 2,300,999 | Williams | Nov. 3, 1942 |
| 2,375,709 | Thompson | May 8, 1945 |
| 2,412,210 | Edson et al. | Dec. 10, 1946 |
| 2,414,486 | Rieke | Jan. 21, 1947 |
| 2,431,766 | Miller et al. | Dec. 2, 1947 |
| 2,461,871 | Bass | Feb. 15, 1949 |
| 2,464,393 | Heim | Mar. 15, 1949 |
| 2,465,364 | Ferrar | Mar. 29, 1949 |
| 2,503,060 | Miller | Apr. 4, 1950 |
| 2,562,188 | Hance | July 31, 1951 |
| 2,569,164 | Greenwood et al. | Sept. 25, 1951 |
| 2,596,167 | Philpott | May 13, 1952 |
| 2,621,306 | Varela et al. | Dec. 9, 1952 |